United States Patent [19]

Watanabe

[11] Patent Number: 4,866,462

[45] Date of Patent: Sep. 12, 1989

[54] LIQUID JET RECORDING APPARATUS CAPABLE OF BEING DRIVEN AT SELECTED DIFFERENT FREQUENCIES

[75] Inventor: Kenjiro Watanabe, Hiratsuka, Japan

[73] Assignee: Canon Kabushiki Kaisha, Tokyo, Japan

[21] Appl. No.: 298,196

[22] Filed: Jan. 17, 1989

Related U.S. Application Data

[63] Continuation of Ser. No. 19,124, Feb. 26, 1987, abandoned.

[30] Foreign Application Priority Data

Feb. 28, 1986 [JP] Japan .................................. 61-44834

[51] Int. Cl.$^4$ .......................... G01D 15/16; B41J 3/04

[52] U.S. Cl. ................................ 346/140 R; 346/1.1; 400/126

[58] Field of Search .......................... 346/140, 1.1, 75; 400/126; 358/298

[56] References Cited

U.S. PATENT DOCUMENTS

| | | | |
|---|---|---|---|
| 3,739,084 | 6/1973 | Heinrich | 358/283 |
| 4,065,775 | 12/1977 | Hou | 346/140 |
| 4,313,124 | 1/1982 | Hara | 346/140 R |
| 4,345,262 | 8/1982 | Shirato et al. | 346/140 R |
| 4,542,384 | 9/1985 | Tazaki | 346/33 R |
| 4,544,931 | 10/1985 | Watanabe et al. | 346/140 R |
| 4,563,689 | 1/1986 | Morakami | 346/140 X |
| 4,574,291 | 3/1986 | Wimmer | 346/140 X |
| 4,617,580 | 10/1986 | Miyakawa | 346/136 |
| 4,631,548 | 12/1986 | Milbrandt | 346/140 X |
| 4,746,936 | 5/1988 | Takahashi | 346/140 |
| 4,769,653 | 9/1988 | Shimoda | 346/140 |

FOREIGN PATENT DOCUMENTS 58-107399 6/1983 Japan .

*Primary Examiner*—Joseph W. Hartary
*Attorney, Agent, or Firm*—Fitzpatrick, Cella, Harper & Scinto

[57] ABSTRACT

A liquid jet apparatus comprises a recording head including a plurality of discharge ports for discharging the liquid therethrough, and a plurality of energy generating units respectively arranged correspondingly to the plural discharge ports for generating energy used for discharging the liquid. A driving unit is provided for driving the energy generating unit and has at least two selectable maximum driving frequencies, the driving unit being able to drive each energy generating unit at the maximum driving frequency. A drive control unit selects a maximum driving frequency from the selectable maximum frequencies.

12 Claims, 4 Drawing Sheets

LIQUID JET RECORDING APPARATUS CAPABLE OF BEING DRIVEN AT SELECTED DIFFERENT FREQUENCIES

This application is a continuation-in-part of application Ser. No. 019,124 filed Feb. 26, 1987, now abandoned.

BACKGROUND OF THE INVENTION

1. Field of the Invention

The present invention relates to a liquid jet recording apparatus and especially to a liquid jet recording apparatus improved in recording speed.

2. Related Background Art

The liquid jet recording (ink-jet recording) system which makes a record by forming droplets of a recording liquid such as an ink and emitting the droplets on to a recording material such as paper has attracted public attention because according to this recording system, recording noise is very low and can be ignored, high-speed recording is possible and recording can be made on a plain paper without special treatment such as fixation. Thus, various types of the recording systems have recently been intensively studied.

The recording head part of recording apparatus used for ink-jet recording generally comprises orifices for discharging ink (liquid discharge port), an ink passage (liquid passage) having a portion where engergy for discharging the ink acts on the ink and an ink chamber for storage of ink to be supplied to said ink passage.

Furthermore, the recording head part of recording apparatus used for ink-jet recording generally has a plurality of orifices and orifices which discharge ink of the same color are supplied with the ink from a common ink chamber in the recording head. To this ink chamber, an ink is supplied from an ink tank through an ink supply pipe.

Operation frequency of the ink-jet recording head depends on the time required for meniscus of ink in the orifices which moves back to the inside of the ink passage after discharging of liquid droplets being restored to the original state by the surface tension of the ink. When liquid droplets are simultaneously discharged from a plurality of orifices of the ink-jet recording head as referred to above, restoration amount of the ink meniscus after discharging of liquid droplets varies depending on the number of the simultaneously discharged liquid droplets and so the time required for restoration of the ink meniscus varies and thus operation frequency also varies. Specifically, this operation frequency decreases with increase of the number of the simultaneously discharged liquid droplets.

Therefore, in the conventional ink-jet recording apparatuses provided with such an ink-jet recording head, when maximum frequency of driving pulse applied to recording head is set so as to attain high-speed recording, this must be set in correspondence with the lowest operation frequency of recording head, namely, the response frequency when the number of the simultaneously discharged liquid droplets is a maximum. Therefore, there has been a limitation in improvement of recording speed.

SUMMARY OF THE INVENTION

The object of the present invention is to provide a liquid jet recording apparatus which makes it possible to perform higher speed recording and which is free from the above problems.

For attaining the object, as shown in FIG. 1, there is provided a recording head 100 which includes discharge member 100A having a plurality of discharge openings for discharging a liquid onto recording medium P, and energy generating means 100B having a plurality of energy generating elements provided for respective discharge openings and generating energy for discharge of liquid. Driving means 110 drives the energy generating means and driving control means 120 which receives image signal I for recording and changes the driving frequency of driving means 110 depending on the number of the discharge openings used in recording.

DETAILED DESCRIPTION OF THE PREFERRED EMBODIMENTS

An embodiment according to the present invention will be explained below with reference to the accompanying drawings.

Figure 1:
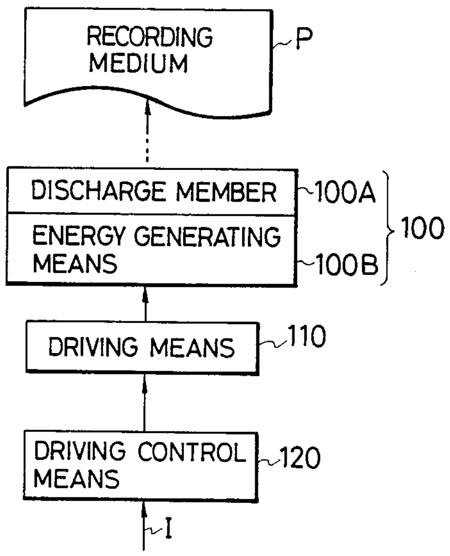
FIG. 1 is an illustration outlining the construction of the present invention.
Figure 2:
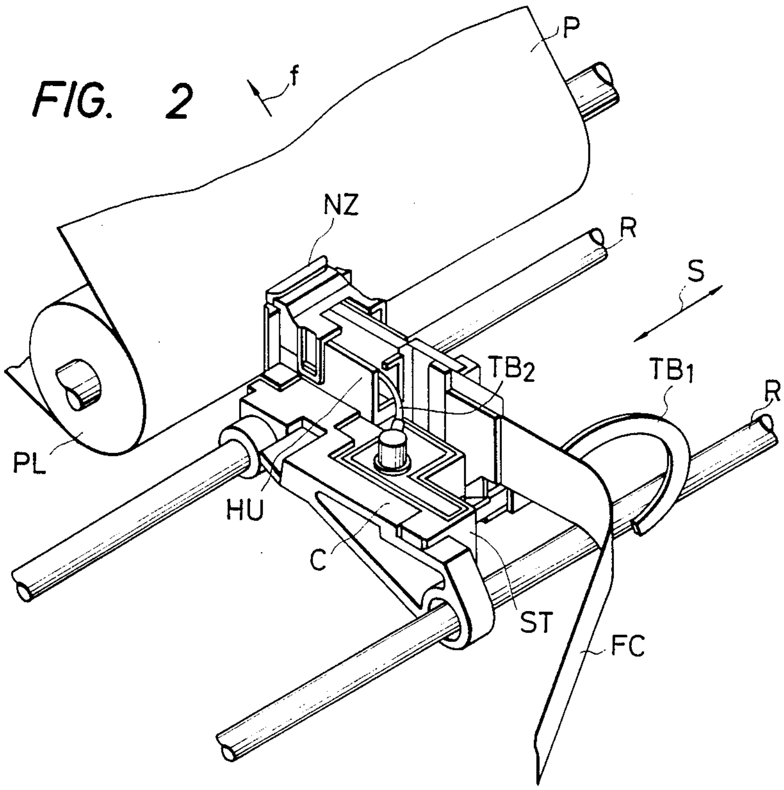
FIG. 2 is an oblique view of one example of an ink-jet printer according to the present invention.

FIG. 2 illustrates one construction of the recording parts of a liquid jet recording apparatus (referred to as "ink jet printer" hereinafter) to which the present invention can be applied. This example of construction illustrates application of the present invention to an ink jet printer where a head unit is fitted to a carriage which moves in a determined direction across the recording surface.

In FIG. 2, HU indicates a liquid jet unit mounted on carriage C and the number of liquid jet units may correspond to the number of ink colors used. FC indicates a flexible cable which collects signal lines, etc. which controls the discharging of ink from the liquid jet recording unit HU.

Carriage C is fixed, for example, to a belt and moves in the direction S by a driving means such as a motor. R indicates guide rails which guide the movenent of carriage C in the S direction.

P indicates a recording material such as a paper carried in the direction f and PL indicates a platen. Thus, carriage C moves by a driving means in the direction S along guide rails R and records on the recording surface.

ST indicates a sub-tank provided in carriage C and TB1 and TB2 indicate an ink supply pipe which communicates a main tank (not shown) with sub-tank ST and an ink supply pipe unit which communicates subtank ST with a liquid chamber (not shown) in head unit HU, respectively.

Figure 3:
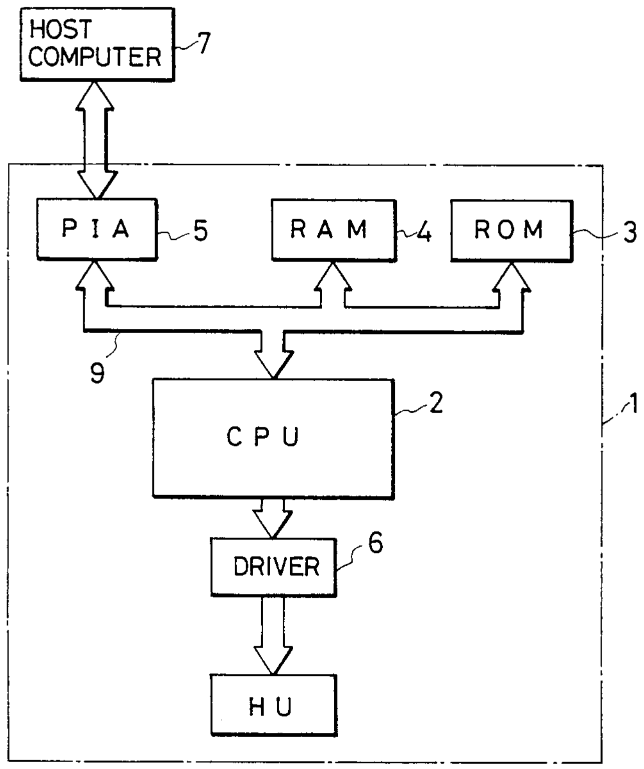
FIG. 3 is a block diagram which illustrates one example of inner construction of an ink-jet printer according to the present invention.

FIG. 3 shows one construction example of a control device of the ink jet printer according to the present invention. This control device, for example, receives printing data from host computer 7, stores printing data corresponding to one line printing and controls the printing head by driver 6 of head unit HU to perform printing.

5 indicates a peripheral interface adapter (abbreviated as PIA hereinafter), which receives recording data transmitted from host computer 7 for printer 1 according to the present invention and transmits the recording data to CPU2.

CPU2 controls each part in printer 1 and conducts the procedure referred to hereinafter with reference to FIG. 4, and may be, for example, in the form of a microcomputer. 4 indicates RAM as a line buffer memory which stores recording data of one line received at PIA5 and 3 indicates ROM in which font of recording output letters or procedures of FIG. 4, etc. carried out by CPU2 are stored. These parts are connected through address data base 9. 6 indicates a driver which controls head unit HU and drives it.

FIG. 3 illustrates one example of a recording procedure of the ink jet printer according to the above embodiment.

In the printer of this kind, the patterns for recording are roughly classified into characters previously stored in ROM3 for formation of font and bit image which constitutes an image based on the data corresponding to individual dots and transmitted from the host side. Furthermore, the character stored in ROM3 may be roughly classified into letter patterns such as English letters, numerals, marks, etc. and graphic patterns for formation of frames of tables, graphs, etc.

Among these patterns, generally, the letter patterns use a small number of liquid droplets simultaneously discharged. For example, in case of a recording head having twenty-four orifices, the number of orifices used in about five. On the other hand, for graphic pattern or bit image, sometimes, liquid droplets are simultaneously discharged from all orifices.

In such a printer, the maximum driving frequency must be set so that a good discharging state can be obtained even when liquid droplets are simultaneously discharged from all orifices in order to make a good recording for all kinds of patterns.

Therefore, in the embodiment, two maximum driving frequencies are set, namely, when a pattern such as a letter for which a small number of liquid droplets are simultaneously discharged is recorded, a higher driving frequency is employed than for recording a graphic pattern or bit image, whereby high-speed recording was contemplated.

Figure 6:
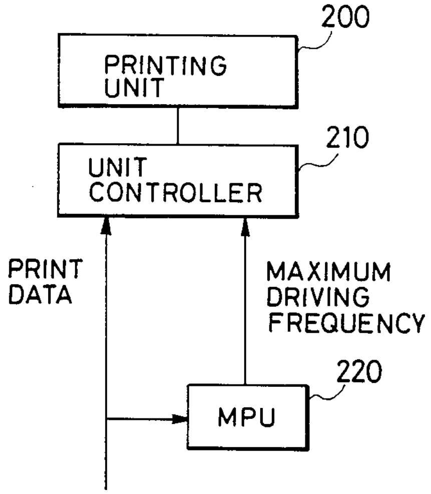
FIG. 6 is an illustration of a block diagram for the generation and selection of the maximum driving frequencies in the present invention.

The generation and selection of the two maximum driving frequencies are executed by c, for example, the construction of a block diagram shown in FIG. 6. The maximum driving frequencies are generated in MPU 220 according to the programs stored in MPU 220, and the generated driving frequencies are selected on the basis of the kind of the printing data, which show the character or the pattern to be printed, input to MPU 220. So, the selected maximum driving frequency is applied to unit controller 210 to drive printing unit 200 at the selected maximum driving frequency.

Figure 4:
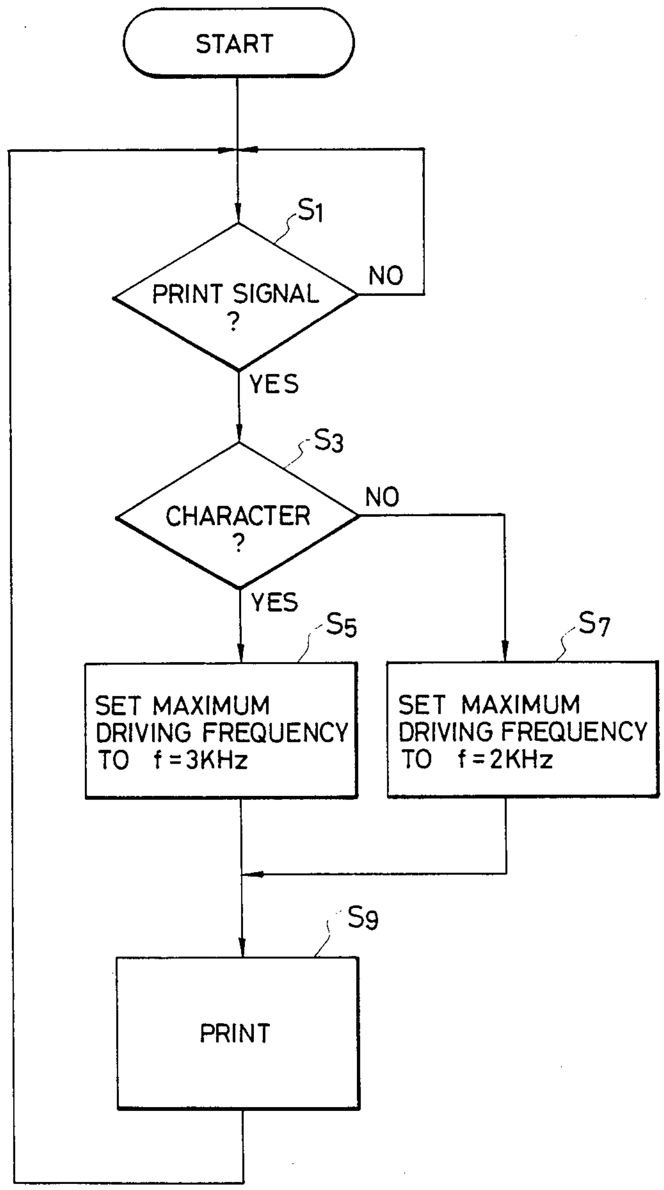
FIG. 4 is a flow chart which illustrates one example of a recording procedure by an ink-jet printer according to the present invention.

In FIG. 4, ink jet printer 1 receives a recording signal from host computer 7 (step S1) and judges whether the signal is a letter or not (step S3), when it is judged to be letter, the driving frequency is set, for example, at 3 KHz (step S5) and when it is judged not to be letter, namely, when it is graphic pattern or bit image, the driving frequency is set, for example, at 2 KHz (step S7) and then the recording procedure is carried out (step S9).

Furthermore, the optimum diameter of liquid droplets discharged in recording graphic patterns is generally different from that in recording letters. When so-called solid portion graphic patterns are recorded, the diameter of dots is desirably such that adjacent dots overlap each other leaving no space, while when letters are recorded with dots of such diameter, small letters are rather difficult to read and so use of a somewhat smaller dot diameter is suitable for recording of letters.

Figure 5:
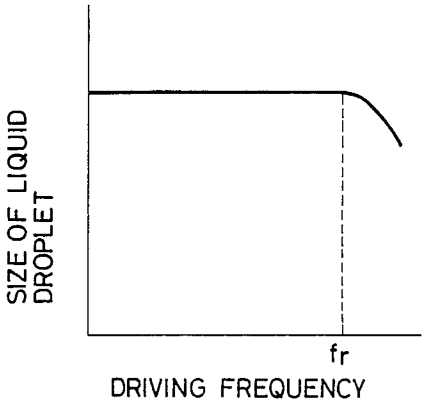
FIG. 5 is a diagram which shows the relation between a driving frequency and the diameter of discharged liquid droplets.

Thus, as shown in FIG. 5, if the driving frequency in recording letters is set at a higher than response frequency, the next driving pulse is applied before restoration of meniscus in the area where driving frequency is higher than response frequency fr and hence the diameter of discharged liquid droplets can be made smaller.

Considering the above fact, in other examples of the present invention, the driving frequency set in step S5 in the procedure shown in FIG. 4 is set at higher than response frequency. As a result, recording speed was further increased and simultaneously the diameter of liquid droplets decreased and recording quality was further improved. Besides, in the above embodiments, the mode under which the driving means is driven at lower maximum driving frequency may be referred to as a graphic mode and the mode under which the driving means is driven at higher maximum driving frequency may be referred to as a letter mode.

As explained hereabove, according to the present invention, further higher speed recording becomes possible by changing driving frequency depending on the patterns to be recorded.

I claim:

1. A liquid jet apparatus comprising:

a recording head including a plurality of discharge ports for discharging liquid therethrough to record an image represented by image data;

energy generating means associated with each of said discharge ports for discharging liquid when an associated energy generating means is driven;

driving means for repeatedly driving said energy generating means at a driving frequency depending on the image data, wherein said driving means is operable in a first recording mode in which the driving frequency cannot exceed a predetermined first maximum driving frequency, and in a second recording mode in which the driving frequency cannot exceed a second predetermined maximum driving frequency; and mode selection means for selecting one of the first and second recording modes depending on whether the image to be recorded comprises graphics or letters.

2. A liquid jet apparatus according to claim 1, wherein the first and second recording modes respectively correspond to graphic and letter modes.

3. A liquid jet apparatus according to claim 1, wherein said apparatus records an object composed of a large number of dots when in the first recording mode, and said apparatus records an object composed of a smaller number of dots when in the second recording mode.

4. A liquid jet apparatus according to claim 1, wherein the maximum driving frequency in the first recording mode is lower than the maximum driving frequency of the second recording mode.

5. A liquid jet apparatus comprising:

a recording head including a plurality of discharge ports for discharging liquid therethrough to record an image represented by image data;

energy generating means associated with each of said discharge ports for discharging liquid when an associated energy generating means is driven;

driving means for repeatedly driving said energy generating means at a driving frequency depending on the image data, wherein the driving frequency cannot exceed one of at least two predetermined selectable maximum driving frequencies depending on whether the image to be recorded comprises graphics or letters; and drive control means for selecting one of the maximum driving frequencies.

6. An apparatus according to claim 5, wherein said drive control means causes said driving means to drive said energy generating means at a lower one of said selectable maximum frequencies when the image to be recorded can be formed by a large number of dots, and at higher frequencies when the image to be recorded can be formed by a small number of dots.

7. An apparatus according to claim 5, wherein said drive control means receives a picture signal representing the image to be recorded and changes the maximum driving frequency on the basis of the picture signal.

8. An apparatus according to claim 5, wherein said drive control means further includes discriminating means for determining if the image can be recorded with a small number of dots, such as when the image can be recorded with a small number od dots, such as when the image to be recorded is English characters, numerals or symbols, and determining if the image cannot be printed with a small number of dots, such as when the image to be recorded is bit images or graphic images.

9. An apparatus according to claim 5, wherein said drive control means selects a maximum driving frequency wherein liquid is stably discharged.

10. An apparatus according to claim 5, wherein the selectable maximum driving frequencies are set so as to correspond to graphic and letter recording modes, and the maximum driving frequency in the letter mode is higher than the maximum driving frequency in the graphic mode.

11. An apparatus according to claim 5, wherein the selectable maximum driving frequencies are set so as to correspond to graphic and letter recording modes, and when said energy generating means is driven at the maximum driving frequency in the letter recording mode, said energy generating means receives repeated driving pulses before a liquid meniscus completely reforms.

12. A method for ink jet recording of image data by depositing liquid droplets on a recording member, the method comprising the steps of:

providing a recording apparatus having a recording head with a plurality of discharge ports for discharging liquid therethrough to record an image represented by image data and energy generating means associated with each of the discharge ports for discharging liquid when an associated energy generating means is driven;

repeatedly driving the energy generating means at a driving frequency depending on the image data, wherein the driving frequency cannot exceed a predetermined first maximum driving frequency in a first recording mode and cannot exceed a predetermined second maximum driving frequency in a second recording mode; and selecting the recording mode depending on whether the image to be recorded comprises graphics or letters.

* * * * *